Jan. 5, 1965 H. M. FLEMING, JR 3,164,817

MEMORY SYSTEM

Filed June 25, 1958

INVENTOR.
HOWARD M. FLEMING JR

BY [signature]
ATTORNEY.

United States Patent Office 3,164,817
Patented Jan. 5, 1965

3,164,817

MEMORY SYSTEM

Howard M. Fleming, Jr., Basking Ridge, N.J., assignor to Monroe International Corporation, a corporation of Delaware Filed June 25, 1958, Ser. No. 744,501
4 Claims. (Cl. 340—174.1)

This invention relates to electronic digital computing or data handling and more particularly to the method and apparatus for reducing the amount of equipment necessary to obtain a one word circulating register and a plural word storage unit.

Electronic digital computing or data handling equipment performing arithmetic and other operations on pulse trains representing numbers and other information has need for a computing or logic operation section in which various operations are performed, for example, the addition of one number to another. Another section which is required is a source of readily available data on which the logical operations are performed. Such a section is called a store. The store usually will contain many numbers which are selected according to their location in the store. The store which may be of the circulating or regenerating type, such as a constantly rotating magnetic drum, for reasons of economy will have fewer means to enter and extract numbers or words, as the pulse trains so representing the numbers and other information are termed, than there are word locations in the store. Accordingly, it is necessary to locate the desired word on a time basis and to extract it for presentation to the logic operation section during the time that it is extracted. The operand with which the word extracted from storage is to be combined must, of course, be available at the same time. Accordingly, it has been found convenient to combine with the ccmputing section and a register in which a number or operand is maintained and made available every word time to insure that it is available when the desired word from storage is extracted. The instant invention combines on a single channel circulating memory a one word circulating register and a plural word store for use in computing or data handling.

The object of the present invention is to use a single channel circulating memory as the storage unit for a plurality of words and as a one word circulating register.

Other objects and a fuller understanding of the invention may be had by referring to the following description and claims, taken in conjunction with the accompanying drawings in which:

In general the instant invention comprises a closed loop circulating arrangement for serial binary digital pulse trains indicative of digital data with a common circulating memory channel in the loop. Separate paths are provided for the circulating register word and storage words from the output of the common circulating memory channel. These two paths converge in a logic operation unit where they are combined as ordered. The single serial output from the logic unit is directed to the input of the circulating register portion of the memory channel and controllably to the word storage portion thereof also.

The output from the circulating memory is time spaced from the input to the circulating memory one word time less the time of transit for data from the output of the memory back to the input thereof. The time of recurrence of a pulse at the output of the memory is one word time and this time is also designated as a cycle. The memory is divided into an integral number of sectors in each of which the circulating register word and one or more storage words are interlaced. The circulating register word is extracted each cycle and passed to one input of the logic unit and the output from the logic unit is fed to the input of the circulating register. If during this cycle a stored word was not also extracted then the circulating register word would have passed through the logic unit unchanged. Since the output from the logic unit may be directed to a storage position in the memory as well as the circulating register position, the contents of the circulating register can thus be transferred to a storage location. A storage word can be transferred to the circulating register by extracting the storage word and ordering the logic unit to add its two inputs together with the logic unit input normally fed by the circulating register having a zero value impressed on it instead.

Figure 1:
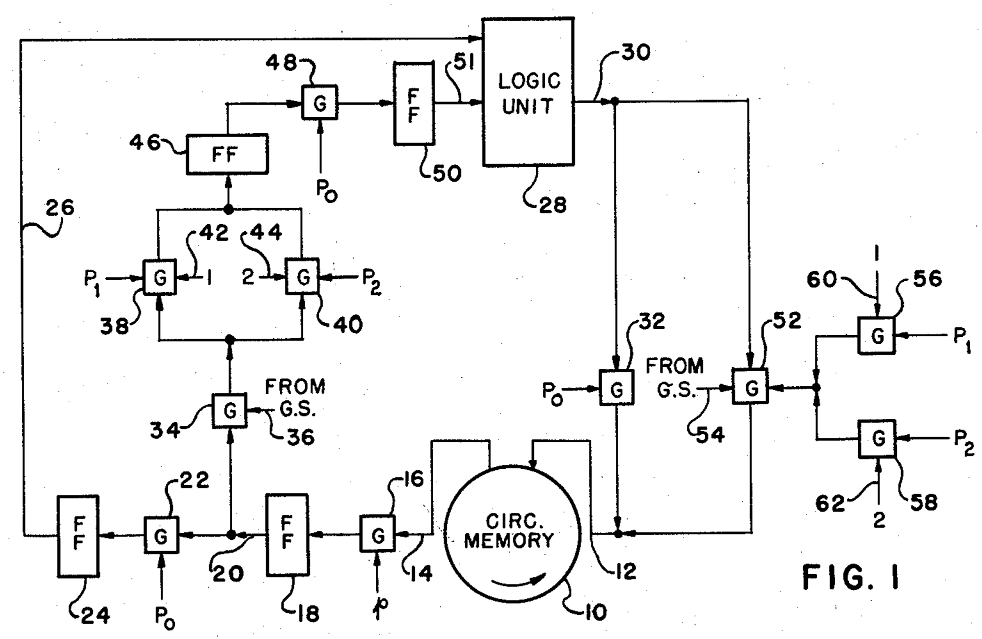
FIG. 1 is a block diagram illustrating one form of the invention.

A detailed logical description of the invention will now be given with reference to FIGS. 1 and 2. As seen in FIG. 1 a single channel circulating memory 10 is shown having an input 12 and an output 14. Timing pulses for correlating the memory 10 with data handling equipment are present and may be supplied by one or more other channels of the same memory device or by a separate timing pulse generator synchronized with memory 10. These timing pulses are designated by $p$, $P_0$, $P_1$, and $P_2$ in FIGS. 1 and 2. Certain significance is attached to these timing pulses which is that: $p$=clock pulse; $P_0$=phase 0 (circulating register) pulse; $P_1$=phase 1 (first storage word) pulse; and $P_2$=phase 2 (second storage word) pulse. The clock pulses ($p$) occur one for each pulse position of the memory while the phase pulses occur for each pulse of the respective word, that is once for every three clock pulses. Other timing pulses such as one for each sector of the memory and one for each complete memory circuit may be provided for designating the sectors of the memory for selection purposes. The latter pulses may be dispensed with and a counter or counters utilized in their stead as shown in Patent No. 2,540,654 to Cohn et al.

Each memory bit is gated out of the output of the memory via gate 16 by clock pulses $p$ and fed to the flip-flop 18. Assumming that bits are represented by the presence of a pulse for a "1" and the absence of a pulse for a "0," the presence of a 1 output from the gate 16 will trigger the flip-flop 18 to one state while the presence of a zero output from gate 16 will trigger flip-flop 18 to its other state. An output 20 is taken from one side of the flip-flop 18 only which is high when the flip-flop is in the one state and is low when in the zero state. This same convention will be followed for the other flip-flops to be mentioned hereinafter. The potential state of the flip-flop 18 as existing on line 20 is gated via gate 22 by a phase zero ($P_0$) pulse to trigger flip-flop 24 to a corresponding state. The output 26 of flip-flop 24 serves as one of the two inputs to logic unit 28. Logic unit 28 may be a binary adder-subtractor circuit which will add together its two inputs to produce a sum output or else subtract input 51 from input 26 to produce a difference output, the determination to add or subtract coming from control stimuli thereto (not shown). Such an adder-subtractor is shown and described on pages 283–285 of "High Speed Computing Devices," by the Staff of Engineering Research Association, published by McGraw-Hill Book Co., 1950.

The output 30 from logic unit 28 is directed to a gate 32 and at $P_0$ time, pulses representing the same enable gate 32 to operate to pass in pulse form the signals on line 30 to the input of the memory 10. The circuit just described from memory 10 through gate 16, flip-flop 18, gate 22, flip-flop 24, logic unit 28 and gate 32 back to memory 10 constitutes a circulating register-accumulator and is traversed every word time. It is well to point out that the pulses present in the memory are first converted to signals lasting for the time between successive *p* pulses in flip-flop 18 and these signals are then converted to signals lasting for the time between successive $P_0$ pulses in flip-flop 24. Reconversion of these longer signals to pulses for reentry into the memory occurs in gate 32.

Figure 2:
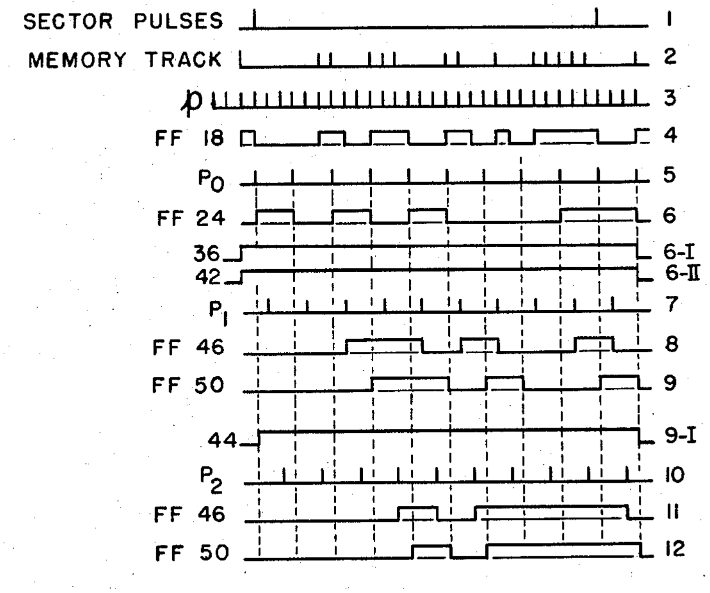
FIG. 2 is a timing and signal diagram for the pulses and signals appearing at various points of the circuit of FIG. 1.

The above described timing is shown illustratively in FIG. 2. Line 1 of FIG. 2 shows two pulses marking the limits of a sector of the circulating memory. Line 2 depicts the pulses appearing in this sector of memory channel as applied to line 14 in FIG. 1. On line 3 are shown the *p* or clock pulses for the memory, one at each pulse position in the memory. Line 4 shows the output of flip-flop 18 which is set to its 1 or high output state for every 1 bit and to its 0 or low output state for every 0 bit with the change in setting occurring at *p* times in response to the output from gate 16. The output from flip-flop 24, which is set to the state of flip-flop 18 at $P_0$ times through the operation of gate 22, is shown on line 6 with the $P_0$ pulses themselves shown on line 5.

The output of flip-flop 18 which holds for the time between successive clock or *p* pulses a representation of the pulses extracted from memory 10 is also passed through gate 34 when a stimulus on line 36 is present to signify that a word from storage is to be obtained. This is shown at FIG. 2 as the continuous pulse on conductor 36 on line 6–I of the drawing. The pulse is continuous for those periods when either of storage words 1 and 2 is desired. The signals passed through gate 34 are applied to both gates 38 and 40 for selection of the particular one of the words present as represented by the signals at successive $P_1$ and $P_2$ times, respectively. A control stimulus on either of lines 42 or 44 will be present to enable the respective one of gates 38 or 40. Since gate 38 has $P_1$ pulses applied to it, gate 38 will pass the first one of the interlaced storage words and gate 40, which has $P_2$ pulses applied to it, will pass the second one of the interlaced storage words. It is to be understood that only one of gates 38 or 40 will be permitted to operate during any one word time or cycle. Applying the pulse shown on line 6–II of FIG. 2, to conductor 42 will enable the $P_1$ word to be gated through gate 38 upon the ocurrence of the $P_1$ pulses shown at line 7 of FIG. 2. In like manner the occurrence of the pulse shown on line 9–I of FIG. 2, to conductor 44 will enable the $P_2$ word to be gated through gate 40 upon the occurrence of the $P_2$ pulses shown on line 10 of FIG. 2. The output from gates 38 or 40 is directed to flip-flop 46 to register the sucessive pulses of the respective storage word as signals existing between successive $P_1$ or $P_2$ pulses. These signals are rephased to coincide with the circulating register-accumulator word signals in flip-flop 24. Provision is made for doing this by having the circulating register word pulses as the last to occur in the interlace arrangement in the circulating memory 10. The rephasing is performed by passing at $P_0$ time through gate 48 a representation of the 1 or 0 state of flip-flop 46 to set flip-flop 50 to the corresponding state. The output 51 of flip-flop 50 to the other input of logic unit 28 is coincident in time with the output 26 of flip-flop 24 applied to the logic unit.

Lines 7, 8 and 9 show the pulses and signals exclusively for the first storage word in the memory channel and identified by phase 1. The output of flip-flop 18 is sampled at $P_1$ time, which pulses are shown on line 7, at gate 38 to effect the setting of flip-flop 46 to the state corresponding to that of flip-flop 18 at sense times. Rephased signals are obtained via gate 48 and the $P_0$ pulses applied thereto to set flip-flop 50 to the states corresponding to those found at flip-flop 46 at $P_0$ times.

The pulses and signals exclusively for the second storage word in the memory channel and identified by phase 2 are present in lines 10, 11 and 12. The $P_2$ pulses in line 10 effect the setting of flip-flop 46 to the state of flip-flop 18 at the $P_2$ sense times as shown in line 11. Line 12 shows these signals rephased by $P_0$ pulses on gate 48 to present from flip-flop 50 the signals from flip-flop 48 rephased to phase 0.

The output of logic unit 28 which consists of signals for the time between successive $P_0$ pulses may be recorded in circulating memory 10 as a storage word through gate 52 which is enabled by a stimulus on line 54 signifying that the signals on line 30 are to be recorded in one of the storage word locations then present. The designation of which phase, $P_1$ or $P_2$, is to receive the word must also be presented. This is accomplished by gates 56 and 58 which are respectively enabled by stimuli on lines 60 and 62 designating the selection of phase 1 or phase 2. If gate 56 is thus selected, $P_1$ pulses will be applied via gate 56 to activate gate 52 to pass at $P_1$ times representations of the signals on line 30, while if gate 58 is selected by having a signal present on line 62, then gate 58 will pass $P_2$ pulses to activate gate 52 to pass representations of the signals on line 30 at $P_2$ times. The pulse train thus generated by gate 52 is directed to the input of the circulating memory interlaced with the pulse train timed by $P_0$ pulses from gate 32.

As described there are two storage words in addition to the circulating register word in each sector of the circulating memory 10. One of the storage words is obtainable along with the circulating register word each word time, and the output from logic unit 28 is recordable in one of the storage word phases as well as in the circulating register phase of a circulating memory sector during a single word time. To effect this the circulating register input to and output from the circulating memory is such that looking at a fixed point, say the output 14 of the circulating memory, exactly one word time elapses for a circuit around the circulating register loop. Thus, since there is a delay for the time between successive clock (*p*) pulses at flip-flop 18, and a delay for the time between successive phase 0 ($P_0$) pulses in flip-flop 24 and taking the time between successive like phase pulses as a bit time, the delay or separation between input to and output from the circulating memory is one word time less 1⅓ pulse times. It is noted that an additional delay of ⅓ or ⅔ pulse times is encounterd in the storage word path at flip-flop 50 in rephasing the storage words to coincide with the circulating register word.

It is noted that the output from flip-flop 50, whether of the phase 1 or phase 2 memory word coincides with the output from flip-flop 24, the circulating register word signals. This is the result of the unlacing procedure. The lacing procedure whereby pulses are recorded at the proper P pulse time is accomplished by gating the unlaced signal from logic unit 28 at the gates 32 for the circulating register and at gate 52 controlled by gates 56 and 58 for the phase 1 and phase 2 memory words, respectively. It is obvious from FIG. 2 what pulses result in the lacing operation.

The following is an expanded explanation of the operation as previously described.

Between the sector pulses of line 1 there are 3 interlaced word of 9 bits each. The $P_0$ word is represented by the signals of line 6 of FIG. 2 and occur as the output of flip-flop 24 and appear on line 26. The $P_0$ word represented by the occurrence or absence of a pulse on line 6 is: $P_0=101010001$.

Similarly the $P_1$ word may be derived from the signal shown on line 9 of FIG. 2 and appears at the output of flip-flop 50 on line 51 when the $P_1$ word is selected by applying the $P_1$ pulses of line 7 to the gate 38. The $P_1$ word is: $P_1=000110100$.

Also the P2 word indicated on line 12 of FIG. 2 appears at the output of flip-flop 50 on line 51 when the $P_2$ word is selected by applying the $P_2$ pulses of line 10 to the gate 40. The $P_2$ word is: $P_2=000010111$.

To follow through the description it will be seen that the memory track of the circulating memory produces the memory track pulses as shown at line 2 of FIG. 2 with time running from left to right or, expressed alternatively, with the least significant digit to the left. The memory track pulses of line 2, FIG. 2 are applied to the gate 16 along with the clock pulses of line 3 of FIG. 2. The coincidence of a clock pulse and a memory track pulse generate a pulse of a width equal to the time between clock pulses which appear at the output of flip-flop 18 at conductor 20 and which is shown at line 4 of FIG. 2. Line 4 represents a composite of three interlaced words on conductor 20. At gate 22 the $P_0$ phase pulses of line 5, FIG. 2 are gated with the output of flip-flop 18 on line 4 of FIG. 2 and when a previously generated pulse exists on line 4 at the time a $P_0$ pulse occurs, flip-flop 24 is then set to provide the pulses shown on line 6 of FIG. 2 and thereby generate the $P_0$ word $P_0=10101001$.

In like manner gates 38 compares the $P_1$ phase pulses of line 7 of FIG. 2 with the flip-flop 18 output of line 4 of FIG. 2 so as to generate the flip-flop 46 output shown on line 8 of FIG. 2. Here again a pulse appears on line 8 if there existed a pulse on line 4 of FIG. 2 when the $P_1$ pulse of line 7 occurred. The output of flip-flop 46 is then shifted ⅔ of a phase to provide the $P_1$ word shown on line 9 of FIG. 2 as $P_1=000110100$.

The $P_2$ word is derived in a like manner by gate 40 acting upon the signals from lines 4 and 10 of FIG. 2, the word of line 11 being shifted ⅓ of a phase time to appear at the flip-flop 50 output as shown on line 12 of FIG. 2 as $P_2=000010111$.

It should be noted that gate 38 to the flip-flop 46 output involves a ⅓ phase time delay while the gate 40 to flip-flop 46 also involves a ⅓ phase time delay and that gate 48 which is activated by $P_0$ imparts a ⅔ phase time delay to the $P_1$ word and a ⅓ phase time delay to the $P_2$ word so that the word on conductor 26 arrives at the logic unit 28 at the same time as the storage word of conductor 51.

A proof of operation shall now be given by working back from the words represented by the signals on lines 6, 9 and 12 of FIG. 2, to obtain the composite signal appearing on line 4 of FIG. 2. It must be realized that the ⅓ phase time delay of flip-flop 18, plus the other delays prior to the return to the circulating memory, amounts to 2 phase time delays. Therefore, since a sector is made up of 9 phase times, the delay between input and output of the circulating memory is equal to 9 minus 2 or 7 phase time delays. Expressed differently, the time for each pulse to travel from conductor 12 through the circulating memory to conductor 14 is 7 phase times. The signals come off of the memory at conductor 14 in the sequence $P_1$, $P_2$, $P_0$. In order that $P_0$ and $P_1$ may arrive at the logic unit 28 at the same time $P_1$ must be delayed a greater time than $P_0$. From 14 to the logic unit $P_0$ is delayed 1⅓ phase times; $P_2$ is delayed 1⅔ phase times and $P_1$ is delayed 2 phase times. From the output of the logic unit to the input 12 of the memory $P_1$ has no delay; $P_2$ due to the lacing timing has a ⅓ phase time delay and $P_0$ has a ⅔ phase time delay. Each of the three $P_0$, $P_1$, and $P_2$ is delayed 7 phase times through the memory. From the input to the logic unit 28 to the output of the memory 10, $P_0$ has a delay of 7⅔ phase times; $P_2$ has a delay of 7⅓ phase times; and $P_1$ has a delay of 7 phase times. The pulses shifted the stated delay times from the trailing edges of the pulses shown on lines 6, 9 and 12 result in the compilation of pulses shown at line 2 of FIG. 2. Thus the generation of the words and their reincarnation has been accomplished.

While the invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. A memory circuit comprising a circulating memory member having an input and output means and including signal generating means for providing a separate train of interlaced timing pulses for each of a plurality of word pulse trains contained in a single channel of the memory, means for applying a first and second word pulse train to the input of said memory under control of their respective timing pulses so that said first and second word pulse trains are inserted in said memory in interlaced fashion, first gate means responsive to the coincidence of the said first word pulse train and the first word timing pulses for unlacing the said first word at the output of said memory, second gate means operative by the concidence of the second word pulse train and the second word timing pulses for unlacing the second word pulse train when it appears at the output of said memory, rephasing means including third gate means responsive to the said first word timing pulse train and the output of the second gate means for providing time coincidence between the outputs of the said first and second gate means, logic means responsive to the first and third gate means for performing computations therewith, fourth gate means interconnected between the output of the logic means and the input of the circulating memory member and gated in accordance with the first word timing pulse train for providing a first word pulse train to be restored in the memory, and fifth gate means interconnected between the output of the logic means and the input of the memory member and gated in accordance with the second word timing pulse train for providing a second word pulse train to be interlaced and recorded with said first word pulse train on the said memory member.

2. Apparatus comprising a circulating memory member having an input and output means and including signal generating means for providing a separate train of interlaced timing pulses for each of a plurality of word pulse trains contained in a single channel of the memory, input gate means connected to the memory for applying a first and second word pulse train to the input of said memory under control of their respective timing pulses so that said first and second word pulse trains are inserted in said memory in interlaced fashion, first gate means operatively connected with the memory output for unlacing the said first word at the output of said memory, second gate means operatively connected with the memory output for unlacing the second word pulse train when it appears at the output of said memory, rephasing means including third gate means operatively connected with the second gate means for providing time coincidence between the outputs of the said first and second gate means, logic means operatively connected with the first and third gate means for performing computations therewith, the said input gate means interconnected with the logic means for providing a first word pulse train to be restored in the memory, and fifth gate means for providing a second word pulse train to be interlaced and recorded with said first word pulse train on the said memory member.

3. A memory circuit comprising a circulating memory member having an input and output means and including signal generating means for providing a separate train of interlaced timing pulses for each of a plurality of word pulse trains contained in a single channel of the memory, input gate means connected with the memory for applying a first and second second word pulse train to the input of said memory under control of their respective timing pulses so that said first and second word pulse trains are inserted in said memory in interlaced fashion, first gate means operatively connected with the memory output responsive to the concidence of the said first word pulse train and the first word timing pulses for unlacing the said first word at the output of said memory, second gate means operatively connected with the memory output operative by the coincidence of the second word pulse train and the second word timing pulses for unlacing the second word pulse train when it appears at the output of said memory, rephasing means including third gate means operatively connected with the second gate means responsive to the said first word timing pulse train and the output of the second gate means for providing time coincidence between the outputs of the said first and second gate means, logic means connected to the first and third gate means for performing computations therewith, the said input gate means interconnected with the logic means for providing a first word pulse train to be restored in the memory, and for providing a second word pulse train to be interlaced and recorded with said first word pulse train on the said memory member.

4. A single channel circulating memory for use as both a one word circulating register and a multi-word storage device for digital data handling wherein a circulating register pulse train and at least two storage word pulse trains are contained in each of a number of independent sections of equal capacity of said memory comprising a circulating memory having an input and an output means for generating separate interlaced timing pulses for each of the pulse trains in a section of said memory, means for applying said circulating register and storage word pulse trains to the input of said memory under the control of their respective timing pulses so that said circulating register and storage word pulse trains are inserted in said memory channel in interlaced fashion, gate means connected to the memory output and responsive to the coincidence of the circulating register pulse train and the circulating register timing pulses for unlacing said circulating register pulse train during the appearance of each section of the circulating register pulse train at the output of said memory, means operatively connected with the circulating word register pulse train and storage word pulse train for changing the pulses of both said circulating register and storage words to signals existing for the time between successive timing pulses for said circulating register pulse train, and gate means connected with the memory output and operative by the storage word timing pulses for selectively unlacing a storage word pulse train when it appears at the output of said memory.

References Cited in the file of this patent

UNITED STATES PATENTS

| | | |
|---|---|---|
| 2,845,609 | Newman | July 29, 1958 |
| 2,866,177 | Steele | Dec. 23, 1958 |
| 2,904,776 | Neff | Sept. 15, 1959 |